United States Patent [19]

Miller

[11] Patent Number: 5,384,881

[45] Date of Patent: Jan. 24, 1995

[54] MULTI-LENS FIBER OPTIC LUMINAIRE

[76] Inventor: Jack V. Miller, 700 N. Auburn Ave., Sierra Madre, Calif. 91024

[21] Appl. No.: 96,889

[22] Filed: Jul. 26, 1993

[51] Int. Cl.⁶ .................................................. G02B 6/04
[52] U.S. Cl. ...................................... 385/115; 385/147
[58] Field of Search ......................... 385/115, 137, 147

[56] References Cited

U.S. PATENT DOCUMENTS

| | | | |
|---|---|---|---|
| 4,483,585 | 11/1984 | Takami | 385/115 |
| 4,523,803 | 6/1985 | Arao et al. | 385/115 X |
| 4,569,571 | 2/1986 | Reidinger | 385/115 |
| 4,597,030 | 6/1986 | Brody et al. | 385/115 X |
| 4,978,186 | 12/1990 | Mori | 385/115 X |
| 5,185,846 | 2/1993 | Basavanhally et al. | 385/115 X |

*Primary Examiner*—Akm E. Ullah

[57] ABSTRACT

A multi-lens luminaire has a generally cylindrical tubular macro housing including a plurality of generally tubular micro housings disposed within the macro housing and angularly spaced about the axis of the macro housing. Each micro housing has a proximal end adjustably retaining a fiber optic light guide emitting light from a remote source of illumination. The light guide is movable along the optical axis of a lens in the distal end of the micro housing, whereby the resulting light beam is capable of zoom adjustment. In a preferred embodiment the macro housing is externally flanged and has a threaded portion adapted for engaging a nut to secure the macro housing in a mounting panel.

14 Claims, 1 Drawing Sheet

MULTI-LENS FIBER OPTIC LUMINAIRE

BACKGROUND OF THE INVENTION

This invention applies to the field of fiber optics, and more particularly spotlight luminaires, known as "pinspot" lights that produce a well collimated distribution of light with virtually no light outside an intense central beam; and wherein the beam may be zoomed to larger diameters.

A narrow, collimated beam requires the light-emitting end of a fiber optic light guide to be at the focus of a lens. If several fibers are used in a bundle to produce higher light levels the source image is larger, the resulting beam is also larger, but no brighter. Further, the individual fibers in the bundle are projected as a beam image of tube bundle, complete with the dark spots from the fiber interstices. For instance, if a bundle of five fibers is used, the projected beam will be Five adjacent circles of light, not a single, smoothly-illuminated circle. If a single, large "solid-core" fiber is used, the beam will be circular, but still will be the fiber image with characteristic fiber-cutting flaws clearly visible, and the larger area of the fiber will be projected as a lager beam, not a brighter one.

The primary purpose of the present invention is to provide a fiber optic light guide luminaire having a uniformly-illuminated beam from a number of fibers, wherein the intensity of the beam is increased as the number of fibers in increased; and wherein the beam has a very uniform intensity, without visible flaws or dark spots in the beam. This will permit the use of white, cold fiber optic illumination quality, without ultraviolet or infrared rays, in spotlight or downlight of sizes presently using MR-16, par-38 or par-56 lamps. The present invention will permit replacement of these relatively inefficient incandescent parlamp or miniature halogen lamps luminaires that produce poor quality light.

SUMMARY OF THE INVENTION

The achievement of the foregoing purposes of the invention is accomplished by the present invention in which a multi-lens luminaire has a macro housing including a plurality of micro housings, each retaining a fiber optic light guide emitting light on the optical axis of a lens in the distal end of the micro housing, whereby the resulting light beam is capable of zoom adjustment. The macro housing is externally flanged and has a threaded portion adapted for engaging a nut to secure the macro housing in a mounting panel.

In a preferred embodiment the installed fiber optic luminaire has approximately the same appearance as an incandescent or halogen spotlight or downlight, but the characteristic fiber optic light is pure white and cold, with no ultraviolet or infrared energy in the beam. In operation, the light emitting fiber end in each fiber optic micro housing is movable along the optical axis to zoom the beam. The multiple beams are almost perfectly congruent, and the beam intensities are additive to produce a composite beam if high intensity. The congruent beam images integrate out each others' irregularities and totally eliminates the images of individual fibers in a fiber optic light guide. Since each fiber produces a complete circular beam, there are no flaws or fiber interstices in the projected beam.

DETAILED DESCRIPTION OF THE DRAWINGS

Figures 1, 2:
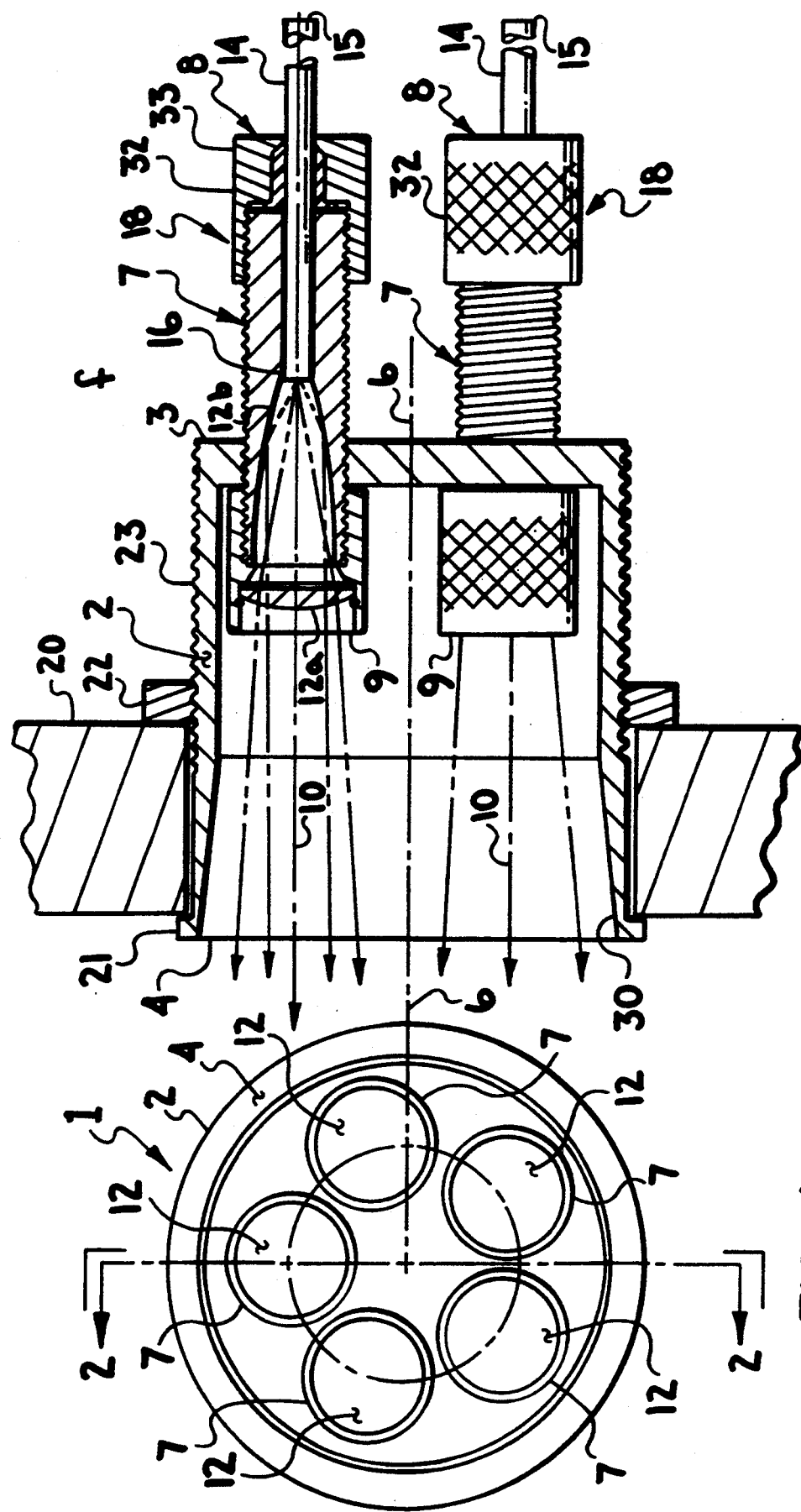
FIG. 1 is a frontal view of a multilens fiber optic luminaire according to the present invention.
FIG. 2 is a side cross-sectional view of the luminiare of FIG. 1 taken along section line 2—2.

In FIGS. 1 and 2, a multilens fiber optic luminaire 1 according to the present invention is shown having a generally cylindrical tubular macro housing 2 having a proximal end 3, a distal end 4 and a central axis 6 therethrough. A plurality of generally tubular micro housings 7 are disposed within macro housing 2, each said micro housing having a proximal end 8, a distal end 9 and an optical axis 10 therethrough which is parallel to the central axis 6 of macro housing 2 and angularly spaced about axis 6 of macro housing 2.

An optical element 12 is on the respective optical axis 10 at the distal end 8 of each micro housing, which may be a lens 12a or a reflector 12b, or both each optical element having a focus f. A plurality of elongated fiber optic light guides 14 having a first end 15 connected to a remote source of illumination, which is not shown. Each light guide 14 has a second end 16 on its respective optical axis 10 at approximately the focus f of a respective clamp the respective light guide 14 adjustably within each micro housing 7, whereby moving the light guide second end 16 towards the distal end 9 of micro housing 7 zooms the beam to a wider included angle.

A means 18 on each micro housing for adjustably positions and secures a respective light guide 14 with its respective micro housing 7, the means comprising a compression nut 32 axially compressing a flexible ring 33 to optical element 12 in each respective micro housing 7. Divergent light rays about each optical axis 10 of each optical element overlap the respective divergent rays of other optical elements, whereby at normal light projection distances the beams formed by overlapping divergent light rays become almost concentric. Then the slight eccentricity of the transverse spacing of the optical elements is such a small part of the beam pattern that the multiple beams appear almost perfectly congruent.

A means for supporting the macro housing 2 with respect to a mounting surface 20 includes an external flange 21 and a nut 22 engaged onto threads 23 to compressively secure the luminiare 1 in panel 20.

Each micro housing 7 has external threads 26 which are threadably engaged into respective threaded holes 27 in proximal end 3 of macro housing 2.

In a preferred embodiment the macro housing has a reflective interior surface 30, which is approximately paraboloidal.

Multilens fiber optic luminaires constructed according to the invention have demonstrated visually perfect beam diameters having zoom ranges exceeding 5:1 beam diameter ratios. A typical fiber optic luminaire of the present invention has five optical systems as shown in FIG. 1, spaced within a one inch diameter circle. At a distance of six feet, the narrow-beam focus of each beam would contain all five beams in a circle less than one foot in diameter. Referring to FIG. 2, moving any fiber end 16 closer to the distal end 9 zoom expands that beam. Further, if desired, one or more fibers may be used to produce a narrow zoom beam, with the rest of the fibers used to produce a wide zoom beam, resulting in a perfectly smooth spotlight in the center of a wider floodlight beam. Also, if for instance, five individual fibers were used in a luminaire according to the invention, one could project a wide floodlight beam of low intensity, having concentric circles of light of increasing intensity, with a bright spot in the center comprised of the sum of the intensities of four lager beams, plus the total intensity of one tightly focussed fiber in the central spotlight beam.

I claim:

1. A multilens fiber optic luminaire including:
   a generally cylindrical tubular macro housing having a proximal end, a distal end and a central axis therethrough;
   a plurality of generally tubular micro housings disposed within said macro housing, each said micro housing having a proximal end, a distal end and an optical axis therethrough which is parallel to the axis of the macro housing and angularly spaced about the axis of the macro housing;
   an optical element on the respective optical axis at the distal end of each micro housing, each said optical element having a focus;
   a plurality of elongated fiber optic light guides having a first end connected to a remote source of illumination and each light guide having a second end on a respective optical axis and at approximately the focus of a respective optical element in each respective micro housing;
   means on each micro housing for adjustably positioning and securing a respective light guide with its respective micro housing; and
   means for supporting said macro housing with respect to a mounting surface.

2. A multilens fiber optic luminaire according to claim 1 in which each micro housing has an externally threaded exterior and proximal end of the macro housing has a plurality of respective threaded holes wherein said micro housings are threadably engaged.

3. A multilens fiber optic luminaire according to claim 1 in which the means for supporting said macro housing with respect to a mounting surface includes a substantially threaded macro housing exterior.

4. A multilens fiber optic luminaire according to claim 1 in which the means for supporting said macro housing with respect to a mounting surface includes a substantially threaded macro housing exterior and an external flange about the exterior of the distal end, whereby said flange abuts a mounting panel surface, said threaded exterior extends through said panel and the macro housing is retained in said panel by a nut threadably engaged onto said external threaded exterior and urging said panel against said flange.

5. A multilens fiber optic luminaire according to claim 1 in which the macro housing has a reflective interior surface.

6. A multilens fiber optic luminaire according to claim 1 in which the reflective interior surface of the macro housing is approximately paraboloidal.

7. A multilens fiber optic luminaire according to claim 1 in which the means on each micro housing for adjustably positioning and securing a respective light guide within its respective micro housing adjusts the second end of said light guide on its respective optical axis with respect to the focus of its respective lens in each respective micro housing, whereby each lens may produce a zoomable beam of light.

8. A multilens fiber optic luminaire including:
   a macro housing having a proximal end and a distal end;
   a plurality of micro housings disposed within said macro housing, each said micro housing having a proximal end and a distal end, including an optical element having a focus on a parallel optical axis;
   a plurality of fiber optic light guides, each having a light-emitting distal end on the optical axis of a micro housing, said fiber optic light guides receiving light at respective proximal ends from a remote source of illumination;
   whereby the optical elements in the micro housings produce a composite light beam.

9. A multilens fiber optic luminaire according to claim 8 in which the light-emitting distal end of any fiber optic light guide is axially adjustable along the optical axis of a respective micro housing.

10. A multilens fiber optic luminaire according to claim 8 in which the adjustment of the distal end of a light guide with respect to the optical element in any micro housing varies the included angle of a light beam produced by its respective optical element.

11. A multilens fiber optic luminaire according to claim 8 in which the optical element is a lens.

12. A multilens fiber optic luminaire according to claim 8 in which the optical element is a reflector.

13. A multilens fiber optic luminaire according to claim 8 in which the optical element is a reflector in combination with a lens.

14. A multilens fiber optic luminaire according to claim 8 in which the distal end of any of said fiber optic light guides is axially adjustable to produce a zoomable beam of light.

* * * * *